No. 670,538. Patented Mar. 26, 1901.
W. W. DEAN.
SUBSCRIBER'S TELEPHONE CIRCUIT.
(Application filed Apr. 28, 1899.)
(No Model.)
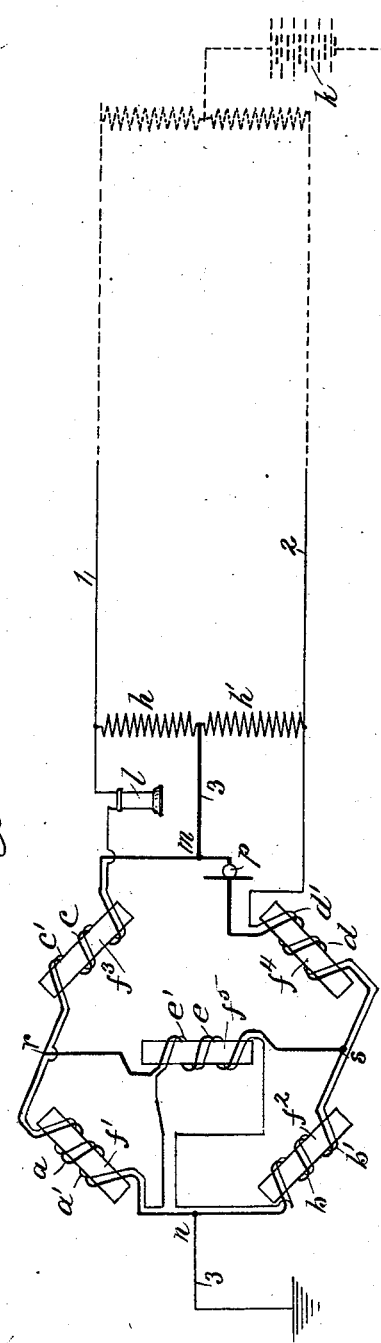
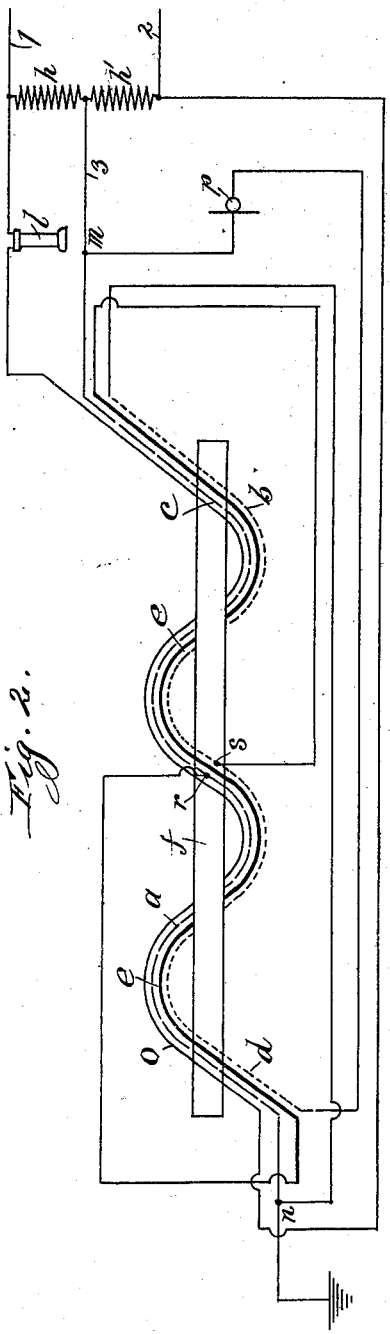
Witnesses:
W. J. Jacker.
Percy C. Gill
Inventor:
William W. Dean
By Ludington & Jones.
Attorneys.

UNITED STATES PATENT OFFICE.

WILLIAM W. DEAN, OF CHICAGO, ILLINOIS, ASSIGNOR TO THE KELLOGG SWITCH BOARD AND SUPPLY COMPANY, OF SAME PLACE.

SUBSCRIBER'S TELEPHONE-CIRCUIT.

SPECIFICATION forming part of Letters Patent No. 670,538, dated March 26, 1901.

Application filed April 28, 1899. Serial No. 714,871. (No model.)

*To all whom it may concern:*

Be it known that I, WILLIAM W. DEAN, a citizen of the United States, residing at Chicago, in the county of Cook and State of Illinois, have invented a certain new and useful Improvement in Subscribers' Telephone-Circuits, of which the following is a full, clear, concise, and exact description, reference being had to the accompanying drawings, forming part of this specification.

My invention relates to a subscriber's telephone-circuit, my object being to provide an improved construction whereby a telephone-transmitter may be effectively supplied with current and serve to vary the resistance to produce the talking-currents.

In accordance with my invention I provide in the circuit of the battery or charging source of electricity a Wheatstone bridge, in one of the arms of which the microphone or resistance-varying transmitter is inserted, while in a plurality of the arms of the bridge the primaries of induction-coils are placed, whereby the actuation of the microphone serves to vary the currents flowing through the primary coils. In inductive relation with the primary coils secondary coils are provided, which are connected together and with the talking-circuit extending to the central station. The several secondary windings are connected together, so that the induced currents will be added to thereby produce an effective talking-current. The necessary resistances in the several arms of the bridge are thus utilized for the induction-coils to transform the variation of the primary current into the induced secondary current. In practice I preferably mount the several primary coils and the secondary coils upon a common core, whereby the elements may all be united in a unitary structure which may be readily connected in the subscriber's circuit.

I have illustrated my invention in the accompanying drawings, in which—

Figure 1 is a diagrammatic view illustrating my invention. Fig. 2 is a diagram illustrating the several coils and windings mounted upon a common core.

Like characters refer to like parts in both figures.

I have illustrated a telephone-line having two limbs 1 2, extending to the central station and connected at the central station with a battery $k$, one pole of which is connected to a third conductor, such as the ground, while the opposite pole is connected to the united ends of the telephone-limbs. At the substation the limbs 1 and 2 are connected, respectively, with the impedance and balancing coils $h$ $h'$, from the electrical center of which extends the conductor 3 to the point $m$ and thence through the Wheatstone bridge to the point $n$ and thence to the third conductor or ground. The primary windings $a, b, c, d$, and $e$ are connected in the respective arms of the Wheatstone bridge, the windings being mounted upon the cores $f'$ $f^2$ $f^3$ $f^4$ $f^5$, respectively. Surrounding the respective cores and in inductive relation with the primary windings are the secondary windings $a'$ $b'$ $c'$ $d'$ $e'$, which are connected together in series, as illustrated, while the ends of the conductors uniting the secondary windings are connected with the opposite limbs 1 and 2 of the telephone-line. The receiver $l$ is included in series with the secondary windings. The microphone $p$ is inserted in one of the arms of the Wheatstone bridge. The combined resistance of the microphone $p$ and coil $d$ is preferably equal to the resistance of the coil $c$, so that under normal conditions the bridge is balanced and no current flows through the transverse arm containing the winding $e$. As thus arranged any variation of the resistance of the microphone $p$ serves to unbalance the system and cause a variation of the currents flowing through the several arms to thereby induce current in the secondary windings, and due to the way in which the secondary windings are connected together the induced currents in the several windings are added together, so that the talking-current is the resultant of the several currents induced in the secondary windings. Thus a decrease of the resistance of microphone $p$ causes an increased current to flow through the windings $d$ and $b$ and a decreased current to flow through the windings $c$ and $a$, and the induced currents in each case are in such a direction that they are added together in the secondary windings. The decrease of the resistance of microphone $p$ causes a flow of current through the coil $e$ in the direction from $s$ to $r$, due to the higher potential at the point $s$, and the induced current is in a direction to be added to the currents induced in the other windings. An increase of the resistance of the microphone $p$ causes a decreased current to flow through the windings $d$ and $b$ and an increased current to flow through the windings $c$ and $a$ and produces a current through the winding $e$ from the point $r$ to the point $s$, and the induced currents in the several coils are in such a direction that the manner in which the coils are connected together results in an adding together of the several currents.

As illustrated in Fig. 2, all of the windings may be mounted upon a single core $f$. In this case, as illustrated, the microphone $p$ is connected in circuit with the primary winding $d$ in one arm of the bridge, while the primary winding $b$ is connected in the succeeding arm. Likewise the windings $c$ and $a$ are connected in the two opposite arms of the bridge and the winding $e$ is connected in the transverse arm extending between the point $r$ and the point $s$. A single secondary winding $o$ is wound upon the core and is connected with the opposite limb of the talking-circuit. The battery-current divides at the point $m$, and one portion passes through the microphone and coils $d$ and $b$ to the point $n$, while the other portion passes through the coils $c$ and $a$ to the point $n$. The coils $d$ and $b$ are connected in circuit, so that the current traverses the same in an opposite direction to the coils $a$ and $c$, and since under normal conditions these two currents are equal and no current flows through the transverse arm connecting the coil $e$ the core is neutral. When, however, the resistance of the microphone $p$ is decreased, current through the coils $d$ and $b$ is increased, while the current through coils $a$ and $c$ is decreased, and the core partakes of a magnetization due to the difference in the strength of the two currents, and this change of magnetism induces a secondary current in the secondary coil, and the current flowing through the transverse arm containing the coil $e$ is in such a direction as to add to the effect of the induced current.

By the term "Wheatstone bridge" as employed in the appended claims I contemplate a system of circuits comprising four arms arranged in two parallel paths, each path containing two arms in series, with a fifth or transverse arm extending between the parallel paths and connected between the junction-points of the two arms of each path.

Having described my invention, what I claim as new, and desire to secure by Letters Patent, is—

1. In combination, a telephone-circuit, a Wheatstone bridge therein comprising four arms arranged in two parallel paths, each path containing two arms in series, with a fifth or transverse arm extending between the parallel paths and connected between the junction-point of the two arms of each path, a microphone in one arm of the bridge, primary induction-coil windings in a plurality of the arms of the bridge, and secondary coils for the respective primaries joined together so that the induced currents are added, substantially as described.

2 In combination, a telephone-circuit, a Wheatstone bridge therein, a microphone in one arm of the bridge, a primary induction-coil winding in each of the several arms of the bridge, and secondary coils for the respective primaries joined together so that the induced currents are added, substantially as described.

3. In combination, a telephone-circuit, a Wheatstone bridge therein comprising four arms arranged in two parallel paths, each path containing two arms in series, with a fifth or transverse arm extending between the parallel paths and connected between the junction-point of the two arms of each path, a microphone in one arm of the bridge, primary induction-coil windings in a plurality of the arms of the bridge, a single core upon which the plurality of windings are mounted, and secondary coils or windings in inductive relation to the primary windings, substantially as described.

4. In combination, a telephone-circuit, a Wheatstone bridge therein comprising four arms arranged in two parallel paths, each path containing two arms in series, with a fifth or transverse arm extending between the parallel paths and connected between the junction-point of the two arms of each path, a microphone in one arm of the bridge, primary induction-coil windings in a plurality of the arms of the bridge, a single core upon which the plurality of windings are mounted, said windings being arranged to normally neutralize the core, and secondary coils or windings mounted on the core, substantially as described.

5. In combination a telephone-circuit, a Wheatstone bridge therein, a microphone in one arm of the bridge, an induction-coil core, primary windings in two of the successive arms of the bridge adapted to impart to the core one polarity, primaries in the other two successive arms adapted to impart to the core the opposite polarity, a primary wound on the core and included in the transverse arm of the bridge, and secondary coils or windings mounted on the core, substantially as described.

6. The combination with a telephone-line having two limbs, of a third conductor adapted to be connected with the said telephone-line, a Wheatstone bridge in said third conductor, a source of electricity for sending current over said third conductor and said telephone-line in series, the primary of an induction-coil winding included in a plurality of the arms of said bridge, and the secondaries for said primary windings connected between the limbs of said telephone-line and arranged so that the induced currents will be added, substantially as described.

7. In combination, a telephone-circuit, a Wheatstone bridge therein, a microphone in one arm of the bridge, a plurality of primary induction-coil windings in a plurality of the arms of the bridge including the transverse arm thereof and secondary coils for the respective primaries joined together so that the induced currents will be added, substantially as described.

In witness whereof I have hereunto subscribed my name in the presence of two witnesses.

WILLIAM W. DEAN.

Witnesses:
W. CLYDE JONES,
PERCY C. GILL.